Oct. 23, 1928.

C. H. BROOKS

ICE CREAM CABINET

Filed Sept. 13, 1927

INVENTOR.
C. H. Brooks,
BY
Mason, Fenwick & Lawrence
ATTORNEYS.

Oct. 23, 1928.  1,688,959
C. H. BROOKS
ICE CREAM CABINET
Filed Sept. 13, 1927   2 Sheets-Sheet 2
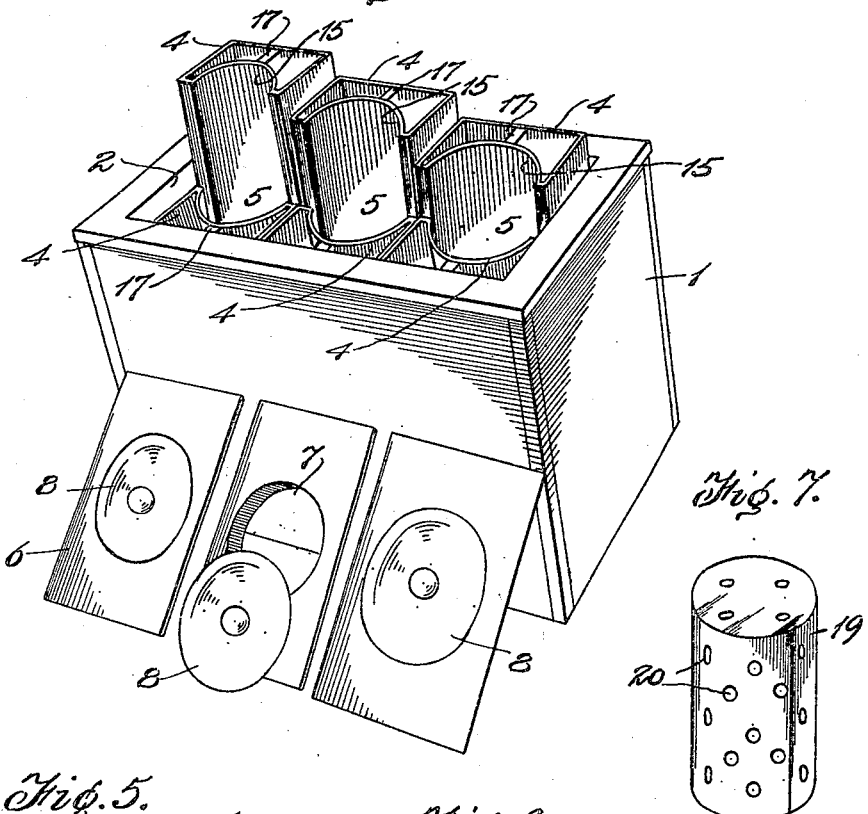
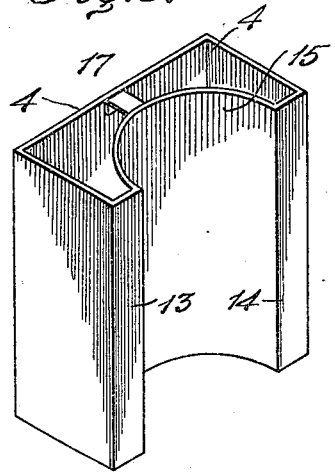
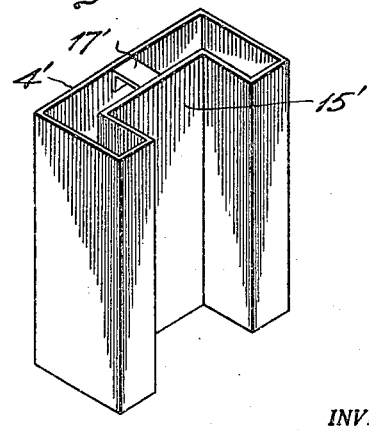
INVENTOR.
C. H. Brooks,
BY
Mason, Fenwick & Lawrence
ATTORNEYS.

Patented Oct. 23, 1928.

1,688,959

UNITED STATES PATENT OFFICE.

CLARENCE H. BROOKS, OF NORFOLK, VIRGINIA, ASSIGNOR, BY MESNE ASSIGNMENTS, TO BROOKS CABINET COMPANY, INC., OF NORFOLK, VIRGINIA, A CORPORATION OF VIRGINIA, AND MANNING MANUFACTURING COMPANY (INCORPORATED), OF RUTLAND, VERMONT, A CORPORATION OF VERMONT.

ICE-CREAM CABINET.

Application filed September 13, 1927. Serial No. 219,308.

This invention relates to improvements in ice cream cabinets in which one or more of a plurality of ice cream containers are adapted to be nested and refrigerated.

The main object of the invention is to provide a cabinet of this type with removable refrigerant containers of a size adapted to be conveniently handled and removed from or inserted in the cabinet, and each shaped so as to form with a similar refrigerant container a chamber in which an ice cream container, or ice cream bricks, can be stored and refrigerated.

Another object of the invention is to provide a cabinet of this type with a plurality of refrigerant containers which can be arranged in cooperating pairs to form refrigerating chambers, each of which is refrigerated independently of any other chamber. In other words, any one refrigerating chamber is completely surrounded by a pair of refrigerant containers, and is effectively insulated from the other chambers, so that in dull seasons any one or more of the chambers may be shut off without affecting the operation of the chamber or chambers in use.

A further object of the invention is to provide cabinets of this type with ventilating tanks of substantially the same size and shape as the standard size ice cream containers, and adapted to be substituted for such containers for the purpose of storing package goods such as brick ice cream or packages of other material which must be refrigerated to retain their shape and qualities which render them saleable.

Other objects relating to structural details of the invention will become apparent from the detailed description thereof.

In the drawings:—

Fig. 4 is a perspective view of the preferred form of my cabinet;

Fig. 5 is a perspective view of an ice container used in the form of the invention shown in Fig. 4;

Fig. 6 is a perspective view of an ice container adapted to be substituted for any container of the type shown in Fig. 5; and Fig. 7 is a perspective view of a ventilating tank adapted to be received in any of the chambers formed by any pair of cooperating ice containers.

Figure 1:
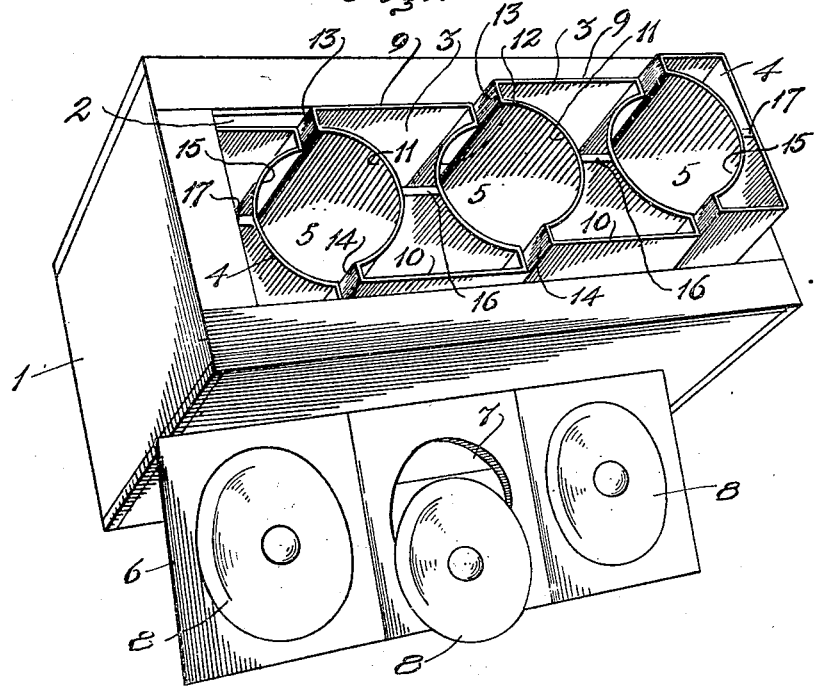
Fig. 1 is a perspective view of one form of my cabinet.

As shown in Fig. 1, the invention comprises a cabinet 1 framed to provide a large compartment 2 adapted to receive a series of refrigerant containers 3 and 4 shaped to cooperate with each other in forming a chamber 5 adapted to receive an ice cream container or ventilating storage tank for package goods to be refrigerated. A top 6 provided with apertures 7, located to correspond with the locations of the chambers 5, is adapted to be positioned on the cabinet to form the top thereof, and covers 8 are used to close the said apertures 7 when desired.

In this form of the invention two different types of refrigerant containers are used. The intermediate containers 3 are provided with flat opposite ends 9 and 10 which fit slidably and snugly between the opposite walls of the chamber 2; and the sides of these containers are bent to form semi-cylindrical recesses 11 and 12, each of which terminates in short flat walls 13 and 14 forming abutments for the similar walls of a cooperating container.

The end walls 4 are shaped to fit against the end walls of the cabinet 1 and between the sides thereof, and have their inner sides provided with a semi-cylindrical recess 15 similar in every respect to the recesses 11 and 12 in the intermediate containers.

Each of the intermediate containers 3 is provided with a handle 16 conveniently secured between the walls 11 and 12 at the centers thereof to facilitate removal of the containers for cleansing or replenishing with refrigerant; and each of the end containers 4 is provided with a handle 17 for the same purpose.

It will be apparent from inspection of Fig. 1 that any number of containers can be placed end to end from any desired number of refrigerating chambers 5, and that any of them can be removed from the cabinet to be packed with ice or other refrigerant and to be inserted in place again without disturbing any of the other containers, or a receptacle placed in any of the refrigerating chambers 5.

The only drawback to the cabinet shown in Fig. 1 is that it necessitates the use of end containers different in shape from the intermediate containers. This disadvantage may be overcome by bisecting the containers 3 to form containers similar in every respect to the end containers 4; that is, by using two containers 4 instead of the double concave intermediate containers 3, as shown clearly in Fig. 2.

Figure 2:
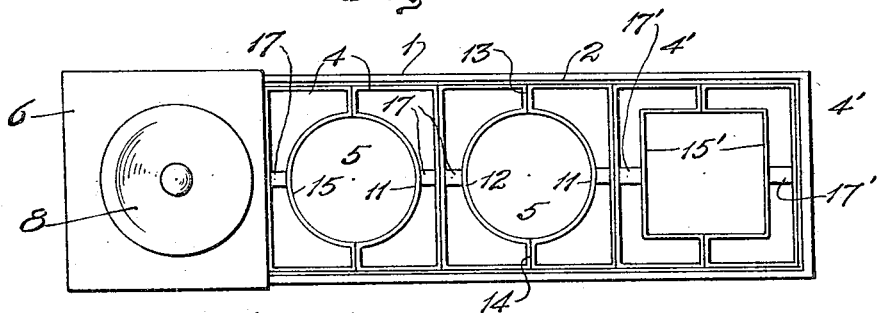
Fig. 2 is a plan view of a modified form thereof.

A further great advantage in using the containers 4 only is that these containers may be arranged transversely of the cabinet as shown in Fig. 2, or may be placed end to end as shown in Figure 4. To secure this result it is obvious that the containers 4 should be as wide as the width of the cabinet between the sides thereof, and should be as deep as one-half of this width. The containers can thus be stamped out to a standard size and used interchangeably with any other in any cabinet, regardless of the number of chambers in the cabinet. In other words, the same size refrigerant containers can be used whether the cabinet has only one hole or fifty holes. The advantage of this standardization will be obvious to anyone skilled in the art.

It is sometimes desirable for packaging rectangular objects to have some of the chambers 5 rectangular. To effect this I prefer to use a container 4' (see Figs. 2 and 6) similar in external dimensions to container 4, but having a rectangular recess 15' instead of the semi-cylindrical recess 15.

Figure 3:
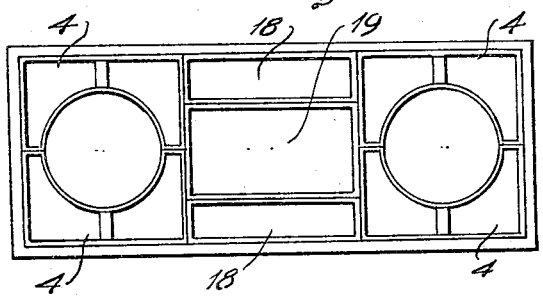
Fig. 3 is a plan view of another modification thereof.

As shown in Fig. 3 the rectangular chamber may be formed by arranging rectangular containers 18 on opposite sides of the cabinet between adjacent containers 4. Any kind of ice cream container or ventilating tank can be used in this rectangular chamber.

Wherever ventilating tanks are used it is essential that the bottoms thereof be waterproof in order to prevent condensed moisture from the refrigerant containers rising into contact with packages at the bottom of such tanks. These tanks 19 may, of course, be cylindrical as shown in Fig. 7, or of any preferred shape. Preferably they should have their sides provided with perforations 20, and should be of a size adapted to fit any of the chambers 5 formed by cooperating refrigerant containers.

Having thus described my invention what I claim is:—

1. A cabinet having a rectangular chamber formed therein, a plurality of similar containers having recessed walls arranged slidably in said cabinet with the recessed walls of adjacent containers in contact with each other, and their opposed recesses forming a chamber.

2. A cabinet having a rectangular chamber formed therein, a plurality of refrigerant containers fitting in pairs slidably and snugly between the opposed walls of said chamber and in contact with each other, each pair of the said containers having similarly shaped recesses formed in their adjacent walls to form a refrigerating chamber.

3. A cabinet having a chamber formed therein, a plurality of pairs of similar refrigerant containers arranged in contact with each other in said chamber, each of said containers being of the same width as the width of said chamber and one-half as deep as said width, and having a recess in one wall thereof cooperating with the similar recess in the adjacent container to form a refrigerating chamber.

4. A cabinet having a plurality of pairs of refrigerant containers snugly and slidably fitted therein, each container having a flat side and flat ends, and having a recess in its remaining side similar and oppositely disposed to the recess formed in the container with which it is paired; the paired recesses forming a refrigerating chamber.

5. A rectangular container having one of its sides flat and the opposite side provided with a cylindrical recess, and a handle secured in said container between said sides.

6. A rectangular container having one of its sides flat and the side opposite thereto shaped as a semi-cylinder with the convex side extending toward said flat side, end walls at right angles to said flat side, said end walls being one-half the width of said flat wall.

In testimony whereof I affix my signature.

CLARENCE H. BROOKS.